United States Patent
Gray et al.

(12)

(10) Patent No.: US 6,486,274 B1
(45) Date of Patent: Nov. 26, 2002

(54) HYDROGEN RESPONSE ZIEGLER-NATTA CATALYST FOR NARROWING MWD OF POLYOLEFIN, METHOD OF MAKING, METHOD OF USING, AND POLYOLEFINS MADE THEREWITH

(75) Inventors: Steven D. Gray, League City, TX (US); Tim J. Coffy, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/687,688

(22) Filed: Oct. 13, 2000

Related U.S. Application Data

(63) Continuation-in-part of application No. 08/789,862, filed on Jan. 28, 1997, now Pat. No. 6,174,971.

(51) Int. Cl.$^7$ .......................... C08F 4/614; C08F 4/634; C08F 4/654; C08F 4/642
(52) U.S. Cl. .................... 526/119; 526/118; 526/124.2; 526/124.3; 526/124.9; 502/104; 502/110; 502/111; 502/115; 502/126; 502/129; 502/133
(58) Field of Search ................................ 502/104, 110, 502/111, 115, 126, 129, 133; 526/118, 119, 124.2, 124.3, 124.9

(56) References Cited

U.S. PATENT DOCUMENTS

| | | | |
|---|---|---|---|
| 4,255,544 A | 3/1981 | Kimura et al. | 526/124 |
| 4,482,686 A | * 11/1984 | Asahi et al. | 526/119 |
| 4,914,069 A | 4/1990 | Job et al. | 502/107 |
| 5,155,187 A | 10/1992 | Shelley | 526/116 |
| 5,610,246 A | 3/1997 | Buehler et al. | 526/119 |
| 5,631,334 A | 5/1997 | Zandona | 526/113 |

FOREIGN PATENT DOCUMENTS

| | | |
|---|---|---|
| EP | 0564211 | 10/1993 |
| EP | 0855409 | 7/1998 |
| EP | 0319173 | 6/1999 |
| JP | 07041514 | 2/1995 |

* cited by examiner

Primary Examiner—David W. Wu
Assistant Examiner—R. Rabago
(74) Attorney, Agent, or Firm—Gilbreth & Associates

(57) ABSTRACT

A Ziegler-Natta type catalyst having an improved hydrogen response provides for narrowing of the MWD of resulting polyolefins polymerized using such catalyst, with such catalyst generally made by a) contacting a soluble magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms; b) contacting reaction product A with a first halogenating/titanating agent to form reaction product B; and c) contacting reaction product B with a second halogenating/titanating agent to form a catalyst component; wherein in at least one of steps b) and c), the halogenating/titanating agent is a blend of Ti(OPr)$_4$ and TiCl$_4$. Catalyst components, catalysts, catalyst systems, polyolefin polymers, and methods of forming each are disclosed.

70 Claims, No Drawings

US 6,486,274 B1

HYDROGEN RESPONSE ZIEGLER-NATTA CATALYST FOR NARROWING MWD OF POLYOLEFIN, METHOD OF MAKING, METHOD OF USING, AND POLYOLEFINS MADE THEREWITH

REFERENCE TO RELATED APPLICATION

The present application is a Continuation-in-part of U.S. patent application Ser. No. 08/789,862, entitiled, "Ziegler-Natta Catalysts for Olefin Polymerization," filed Jan. 28, 1997, now U.S. Pat. No. 6,174,971, incorporated by reference.

BACKGROUND OF THE INVENTION

1. Field of the Invention

The present invention relates to catalysts, to methods of making catalysts, to methods of using catalysts, to methods of polymerizing, and to polymers made with such catalysts. In another aspect, the present invention relates to polyolefin catalysts, to methods of making such catalysts, to methods of using such catalysts, to polyolefin polymerization, and to polyolefins. In even another aspect, the present invention relates to Ziegler-Natta catalysts, to methods of making such catalysts, to methods of using such catalysts, to polyolefin polymerization, and to polyolefins.

2. Description of the Related Art

Having been around since the early 1950's, Ziegler-type polyolefin catalysts, their general methods of making, and subsequent use, are well known in the polymerization art.

However, while much is known about Ziegler-type catalysts, there is a constant search for improvements in their polymer yield, catalyst life, catalyst activity, and in their ability to produce polyolefins having certain properties.

U.S. Pat. No. 4,255,544, issued Mar. 10, 1981 to Kimura et al., discloses a process for polymerization of ethylene utilizing a catalyst comprising (A) the reaction product of a magnesium compound and titanium halide, and (B) an organic aluminum compound, wherein Component A is prepared by reacting magnesium dialkoxide with a hologen-containing silicon compound and an alcohol to provide a solid material and then reacting the solid material with titanium halide in the presence of an alkoxy-containing silicon compound.

U.S. Pat. No. 4,914,069, issued Apr. 3, 1990 to Job et al., discloses the preparation of an olefin polymerization catalyst component having improved activity and selectivity, which are prepared by (a) halogenating a magnesium compound containing at least one aryloxy, alkyl or carbonate or alkloxy group with a first halide of tetravalent titanium and a first electron donor; (b) contacting the resulting product with a second halide of tetravalent titanium; and (c) washing a resulting treated halogenated product with an inert hydrocarbon liquid. In the process, a second electron donor is used in step (a) or (b), and that the product of step (b) is contacted in a step (b2) with a third halide of tetravalent titanium at a temperature of 40° C. to 140° C. and thereafter the treated product is washed in step (c).

U.S. Pat. No. 5,155,187, issued Oct. 13, 1992 to Shelly, discloses a polymerization method utilizing a catalyst which is the reaction product generally of a silicon-containing compound, a magnesiumdialkyl, an alcohol, a halide-containing metal compound, an aluminum alkoxide, and a second halide-containing metal compound.

U.S. Pat. No. 5,610,246, issued Mar. 11, 1997 to Buehler et al., discloses a process for polymerizing propylene using a silica-supported catalyst. The catalyst comprises the product obtained by contacting silica, in random order, with (1) at least one hydrocarbon soluble magnesium-containing compound; and (2) a first modifying compound selected from the group consisting of silicon halides, boron halides, aluminum halides and mixtures thereof followed by a second specified modifying compound.

U.S. Pat. No. 5,631,334, issued May 20, 1997 to Zandona, disclose a process for the manufacture of a catalytic solid for the (co)polymerization of at least one olefin, comprising the coprecipitate magnesium and of at least one transition metal.

However, in spite of these advancements in the prior art, none of these prior art references disclose or suggest that the nature of R in a mixture of $TiCl_4/Ti(O^iR)_4$ will provide a catalyst having improved hydrogen response which can provide polyolefins having narrower molecular weight distribution ("MWD").

Thus, there is a need in the art for a polyolefin catalyst.

There is another need in the art for a method of making a polyolefin catalyst.

There is even another need in the art for a method of polymerizing olefins.

There is still another need in the art for polyolefins of narrower MWD.

There is yet another need in the art for a catalyst having improved hydrogen response.

There is even still another need in the art for a method of making a polyolefin catalyst that provides polymers having a narrow molecular weight distribution wherein the method comprises using a mixture of $TiCl_4/Ti(O^iPr)_4$.

There is even yet another need in the art for a method of making polyolefins of narrower MWD.

These and other needs in the art will become apparent to those of skill in the art upon review of this specification, including its claims.

SUMMARY OF THE INVENTION

It is one object of the present invention to provide for a polyolefin catalyst.

It is another object of the present invention to provide for a method of making a polyolefin catalyst.

It is even another object of the present invention to provide for a method of polymerizing olefins.

It is still another object of the present invention to provide for polyolefins of narrower MWD.

It is yet another object of the present invention to provide a catalyst having improved hydrogen response.

It is even still another object of the present invention to provide for a method of making a polyolefin catalyst that provides polymers having a narrow molecular weight distribution wherein the method comprises using a mixture of $TiCl_4/Ti(O^iPr)_4$.

It is even yet another object of the present invention to provide a method of making polyolefins of narrower MWD.

One embodiment of the present invention provides a catalyst component produced by a process generally comprising: a) contacting a soluble magnesium dialkoxide compound of the general formula $Mg(OR")_2$ with a halogenating agent capable of exchanging one halogen for one alkoxide to form a reaction product A, where R" is a hydrocarbyl or substituted hydrocarbyl having from 1 to 20 carbon atoms; b) contacting reaction product A with a first halogenating/titanating agent to form reaction product B; and c) contacting reaction product B with a second halogenating/titanating agent to form a catalyst component. Preferably, the first halogenating/titanating is a blend of Ti(OPr)$_4$/TiCl$_4$. The soluble magnesium dialkoxide compound is a reaction product of a reaction comprising an alkyl magnesium compound of the general formula MgRR', wherein R and R' are alkyl groups of 1–10 carbon atoms and may be the same or different, and an alcohol of the general formula R"OH wherein the alcohol is linear or branched and wherein R" is an alkyl group of 4–20 carbon atoms.

Another embodiment of the present invention provides a catalyst. Generally, the catalyst is produced by a process comprising contacting a catalyst component of the invention together with an organoaluminum preactivating agent. The catalyst component is generally produced by a process comprising, i) contacting a magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms; ii) contacting reaction product A with a first halogenating/titanating agent to form reaction product B; and iii) contacting reaction product B with a second halogenating/titanating agent. Preferably the first halogenating/titanating agent is a blend of Ti(OPr)$_4$/TiCl$_4$. The catalyst of the present invention has an improved hydrogen response and is useful in producing a polymer of a desired molecular weight distribution.

Even another embodiment of the present invention provides a polymer produced by a process comprising a) contacting one or more α-olefin monomers together in the presence of a catalyst of the invention under polymerization conditions. Preferably the catalyst is used to polymerize polyethylene monomers to produce polyethylene polymers. The catalyst is generally produced by a process comprising: i) contacting a soluble magnesium dialkoxide compound of the general formula Mg(OR)$_2$ with a halogenating agent capable of exchanging one halogen for one alkoxide to form a reaction product A, where R is a hydrocarbyl or substituted hydrocarbyl having from 1 to 20 carbon atoms; ii) contacting reaction product A with a first halogenating/titanating agent to form reaction product B; and iii) contacting reaction product B with a second halogenating/titanating agent to form a catalyst component. Preferably, the halogenating/titanating agent in at least one of steps b) and c) is Ti(OPr)$_4$/TiCl$_4$. The catalyst producing process may further comprise contacting the catalyst component with an organoaluminum agent.

Still another embodiment of the present invention provides a catalyst system comprising a catalyst of the invention and an inert support. Preferably the inert support is a magnesium compound.

Yet another embodiment of the present invention provides a process for forming a catalyst component. Generally the process comprises: a) contacting a soluble magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms. The process further comprises: b) contacting reaction product A with a first halogenating/titanating agent to form reaction product B; and c) contacting reaction product B with a second halogenating/titanating agent to form a catalyst component, or reaction product, C. Preferably the halogenating/titanating agent in at least one of steps b) and c) is Ti(OPr)$_4$/TiCl$_4$.

Even still another embodiment of the present invention provides a process for forming a catalyst, the process comprising contacting a catalyst component of the invention together with an organoaluminum preactivating agent.

Even yet another embodiment of the present invention provides a process for α-olefin polymerization. Generally the polymerization process comprises: a) contacting one or more α-olefin monomers together in the presence of a catalyst of the invention, under polymerization conditions; and b) extracting polyolefin polymer. The polymerization process is useful in producing polymers, preferably polyethylene polymer, having a molecular weight distribution of less than about 7.0.

These and other objects in the art will become apparent to those of skill in the art upon review of this specification, including its claims.

DETAILED DESCRIPTION OF THE INVENTION

The method of the present invention for making a catalyst component generally includes the steps of forming a metal dialkoxide from a metal dialkyl and an alcohol, halogenating the metal dialkoxide, halogenating/titanating in one or more steps to form the catalyst with at least one of the steps utilizing mixture of TiCl$_4$/Ti(O$^i$Pr)$_4$, and then treating the catalyst with a preactivation agent such as an organoaluminum to form a preactivated catalyst.

A proposed mechanism for the method of the present invention is generally as follows:

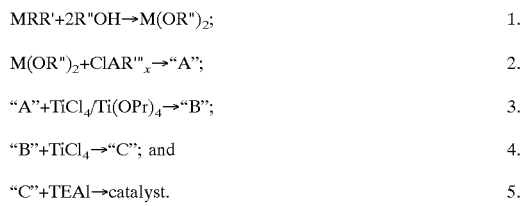

In the above formulas, M may be any suitable metal, preferably a Group IIA metal, most preferably Mg. In the above formulas, R, R', R" and R'" are each independently hydrocarbyl or substituted hydrocarbyl moieties, with R and R' having from 1 to 20 carbon atoms, preferably from 1 to 10 carbon atoms, more preferably from 2 to 6 carbon atoms, and even more preferably, from 2 to 4 carbon atoms. R" generally comprises from 3 to 20 carbon atoms, R'" generally comprises from 2–6 carbon atoms. Any combination of two or more of R, R', R" and R'" may be the same, or the R groups may be different from one another.

In the above formula ClAR'"$_x$, A is a nonreducing oxyphilic compound which is capable of exchanging one chloride for an alkoxide, R'" is a hydrocarbyl or substituted hydrocarbyl, and x is the valence of A minus 1. Examples of A include titanium, silicon, aluminum, carbon, tin and germanium, most preferred of which is titanium and silicon wherein x is 3. Examples of R'" include methyl, ethyl, propyl, isopropyl and the like having 2–6 carbon atoms. R'" is generally propyl.

While the exact composition of product "A" is unknown, it is believed that it contains a partially chlorinated metal compound, one example of which may be ClMg(OR"). The first chlorination/titanation produces product "B" which is probably a complex of chlorinated and partially chlorinated metal and titanium compounds and for example, may possibly be represented by (MCl$_2$)$_y$. (TiCl$_x$(OPr)$_{4-x}$)$_z$. The second chlorination/titanation produces a catalyst component "C" which is also probably a complex of chlorinated and partially chlorinated metal and titanium compounds but different from "B" and may possibly be represented by $(MCl_2)_{y'} \cdot (TiCl_{x'}(OPr)_{4-x'})_{z'}$. It is expected that the level of chlorination of "C" would be greater than that of "B". This greater level of chlorination would produce a different complex of different compounds. While this description of the reaction products offers the most probable explanation of the chemistry at this time, the invention as described in the claims is not limited by this theoretical mechanism.

Metal dialkyls and resultant metal alkoxides suitable for use in the present invention include any that which when utilized in the present invention will yield a suitable polyolefin catalyst. Preferred metal dialkoxides and dialkyls include Group IIA metal dialkoxides and dialkyls. More preferably the metal dialkoxide or dialkyl is a magnesium dialkoxide or dialkyl.

In the practice of the present invention, the magnesium dialkyl (MgRR') may be any magnesium dialkyl where R and R' are as described above. R and R' may be the same or different. Non-limiting examples of suitable magnesium dialkyls include diethyl magnesium, dipropyl magnesium, dibutyl magnesium, butylethylmagnesium, etc. Butylethylmagnesium (BEM) is the preferred magnesium dialkyl.

In the practice of the present invention, the metal dialkoxide is preferably a magnesium compound of the general formula $Mg(OR")_2$ where R" is a hydrocarbyl or substituted hydrocarbyl of 1 to 20 carbon atoms.

The metal dialkoxide is most preferably soluble and most preferably non-reducing. A non-reducing compound has the advantage of forming $MgCl_2$ instead of insoluble $Ti^{+3}$ species formed by reduction of compounds such as MgRR' which tend to form catalysts having a broad particle size distribution. In addition, $Mg(OR")_2$ is less reactive than MgRR' and the chlorination with a mild chlorinating agent, followed by a simultaneous chlorination/titanation with a mild reagent and a second chlorination/titanation with a stronger reagent are gradual and successively stronger reactions which may result in more uniform product, i.e., better catalyst particle size control and distribution.

Non-limiting examples of preferred species of metal dialkoxides which are useful include magnesium butoxide, magnesium pentoxide, magnesium hexoxodie, magnesium di(2-ethylhexoxide), and any alkoxide suitable for making the system soluble. The most preferred metal alkoxide species is magnesium di(2-ethylhexoxide).

As a non-limiting example, a magnesium dialkoxide, such as magnesium di(2-ethylhexoxide), may be produced by reacting an alkyl magnesium compound (MgRR'), such as butyl ethyl magnesium (BEM), with an alcohol (ROH), such as 2-ethylhexanol.

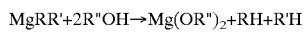

In the case of BEM, RH and R'H are butane and ethane, respectively. The reaction takes place at room temperature and the reactants form a solution.

In the practice of the present invention, any alcohol yielding the desired metal dialkoxide may be utilized. As a non-limiting example, the alcohol may be any alcohol of the general formula R"OH where R" is an alkyl group of 2–20 carbon atoms. The alcohol may be linear of branched. Non-limiting examples of the alcohol include ethanol, propanol, isopropanol, butanol, isbutanol, 2-ethyl-1-hexanol, etc. Generally, the alocohol utilized will have at least 3, preferably at least 4, more preferably at least 5, and most preferably at least 6 carbon atoms. While it is believed that almost any alcohol may be utilized, it is preferred that a higher order branched alcohol be utilized. The preferred alcohol is 2-ethylhexanol.

The amount of alcohol added to the slurry is generally in the range of about 0.5 equivalents to about 4 equivalents (equivalents are relative to the magnesium or metal compound throughout), preferably in the range of about 1 to about 3 equivalents.

Alkyl metal compounds are highly associative due to electron-deficient bonding which results in a high molecular weight species which is very viscous in solution. This high viscosity may be reduced by the addition of an aluminum alkyl, such as triethylaluminum, which disrupts the association between the individual alkyl metal molecules. The preferred ratio of alkyl aluminum to metal is 0.001:1 to 1:1, more preferably 0.01 to 0.1:1 and most preferably 0.03:1 to 0.05:1. In addition, an electron donor such as an ether, e.g. diisoamyl ether (DIAE) may be used to further reduce the viscosity of the alkyl metal. The preferred ratio of electron donor to metal is 0:1 to 10:1 and more preferably is 0.1:1 to 1:1.

Agents useful in the halogenating step for halogenating the metal alkoxide include any halogenating agent which when utilized in the present invention will yield a suitable polyolefin catalyst. Preferably the halogenating step is a chlorinating step and the halogenating agent is a chloride.

Preferably, the chloride halogenating agent ("chlorinating agent") is a monochloride compound which only partially chlorinates the magnesium alkoxide. The preferred chlorinating agent is of the general formula $ClAR'''_x$ or $ClAOR'''_x$, where A is a nonreducing oxyphilic compound which is capable of exchanging one chloride for an alkoxide, R''' is alkyl and x is the valence of A minus 1. Examples of A are titanium, silicon, aluminum, carbon, tin and germanium, most preferred of which is titanium and silicon wherein x is 3. Examples of R''' are methyl, ethyl, propyl, isopropyl and the like having 2–6 carbon atoms. Examples of a chlorinating agent effective in the present invention are $ClTi(O^iPr)_3$ and $ClSi(Me)_3$.

Halogenating the metal alkoxide compound is generally conducted in a hydrocarbon solvent under an inert atmosphere. Non-limiting examples of suitable solvents include toluene, heptane, hexane, octane and the like. The preferred solvent is hexane.

The halogenating step is generally carried out at a temperature in the range of about 0° C. to about 100° C. and for a reaction time in the range of about 0.5 to about 24 hours. Preferably, the halogenating step is carried out at a temperature in the range of about 20° C. to about 90° C. and for a reaction time in the range of about 1 hour to about 4 hours.

Once the halogenating step is carried out and the metal alkoxide halogenated, the soluble product "A" is subjected to one or more halogenation/titanation treatments, at least one of which must utilize a mixture of $TiCl_4/Ti(O^iPr)_3$. Preferably, the first halogenation/titanation step utilizes a mixture of $TiCl_4/Ti(O^iPr)_3$.

In general, the halogenating/titanating agent is a tetrasubstituted titanium compound with all four substituents being the same and the substituents being a halide or an alkoxide or phenoxide with 2 to 10 carbon atoms, such as $TiCl_4$ or $Ti(OR''')_x$. The halogenating/titanation agent is preferably a chlorination/titanation agent.

The preferred chlorinating/titanating agent may be a single compound or a combination of compounds. The method of the present invention provides an active catalyst after the first chlorination/titanation step; however, chlorination/titanation is preferably performed twice, using a different compound or combination of compounds at each addition, and uses a stronger chlorination/titanation agent with each successive chlorination/titanation treatment.

The first chlorination/titanation agent is preferably a mild titanation agent, preferably a blend of a titanium halide and a organic titanate. It is believed that the blend of titanium halide and organic titanate react to form a titanium alkoxyhalide, Ti(OR)$_a$X$_b$, where OR and X are an alkoxide and halide, respectively, a+b is the valence of titanium which is typically 4 and both a and b may be fractional, e.g. a=2.5 and b=1.5.

More preferably, the first chlorinating/titanating agent is a blend of TiCl$_4$ and Ti(OiPr)$_3$ or a blend of TiCl$_4$ and Ti(OiPr)$_4$. At least one of the chlorination/titanation steps must utilize a blend of TiCl$_4$ and Ti(OiPr)$_4$ and it is preferred that the first chlorinating/titanating agent is a blend of TiCl$_4$ and Ti(OiPr)$_4$.

For either TiCl$_4$/Ti(OBu)$_4$ or TiCl$_4$/Ti(OiPr)$_4$, the ratio of TiCl$_4$ to either Ti(OBu)$_4$ or Ti(OiPr)$_4$ (whichever is utilized) is in a range from 0.5:1 to 6:1, more preferably from 1:1 to 4:1, and most preferably from 2:1 to 3:1. (OC$_{12}$H$_5$)Cl$_3$.

The first halogenation/titanation step is generally carried out in a hydrocarbon solvent. Nonlimiting examples of suitable hydrocarbon solvents include heptane, hexane, toluene, octane and the like. The product "A" is soluble in the hydrocarbon solvent.

A solid product "B" is precipitated at room temperature following the addition of the first halogenation/titanation agent to the soluble product "A".

The amount of halogenation/titanation agent utilized must be sufficient to precipitate a solid product from the solution. In general, the amount of halogenation/titanation agent utilized, based on the ratio of titanium to metal will generally be in the range of about 0.5 to about 5, preferably in the range of about 1 to about 4, and most preferably in the range about 1.5 to about 2.5.

The solid product "B" precipitated in the first titanation step is then recovered by any suitable recovery technique, and washed with a hydrocarbon solvent.

Compounds suitable for use as the second halogenation/titanation agent include those suitable for use as the first halogenation/titanation agent, except that preferably, the second agent is a stronger agent. The second halogenation/titanation agent is stronger, and is preferably a titanium halide, more preferably titanium tetrachloride [TiCl$_4$].

The second halogenation/titanation step is generally carried out by slurrying the solid product "B" in a hydrocarbon solvent to produce reaction product, or catalyst component, "C". Hydrocarbon solvents listed as suitable for the first halogenation/titanation step may be utilized. In general, the amount of titanium tetrachloride utilized will generally be in the range of about 0.1 to about 5 equivalents, preferably in the range of about 0.15 to about 4 equivalents, most preferably in the range of about 0.175 to about 2.5.

The catalyst component "C" may be combined with an organometallic cocatalyst component (a "preactivating agent") to form a preactivated catalyst suitable for the polymerization of olefins. Typically, the cocatalysts which are used together with the transition metal containing catalyst component "C" are organometallic compounds of Group Ia, IIa, and IIIa metals such as aluminum alkyls, aluminum alkyl hydrides, lithium aluminum alkyls, zinc alkyls, magnesium alkyls and the like.

The preactivating agent is preferably an organoaluminum compound, more preferably an aluminum alkyl of the formula AlR^$_3$ where R^ is an alkyl having 1–8 carbon atoms or a halide. Preferred organoaluminum preactivating agents include trialkyl aluminums, such as, for example, trimethyl aluminum (TMA), triethyl aluminum (TEAl) and triisobutyl aluminum (TiBAl). The preferred preactivating agent is TEAl. The ratio of Al to titanium is in the range from 0.01:1 to 2:1 and preferably is 0.25:1 to 1.2:1. Subsequently, the catalyst is recovered and washed with a hydrocarbon solvent.

Optionally, an electron donor may be added with the halogenation agent, the first mild halogenation/titanation agent, or the second stronger halogenation/titanation agent. Most preferably, an electron donor is utilized in the second halogenation/titanation step. Electron donors for use in the preparation of polyolefin catalysts are well known, and any suitable electron donor may be utilized in the present invention which will provide a suitable catalyst.

Electron donors, also known as Lewis bases, are organic compounds of oxygen, nitrogen, phosphorous, or sulfur which can donate an electron pair to the catalyst.

The electron donor may be a monofunctional or polyfunctional compound, advantageously selected from among the aliphatic or aromatic carboxylic acids and their alkyl esters, the aliphatic or cyclic ethers, ketones, vinyl esters, acryl derivatives, particularly alkyl acrylates or methacrylates, and silanes. A preferred example of a suitable electron donor is di-n-butyl phthalate. A more preferred example of a suitable electron donor is an alkylsilylalkoxide of the general formula RSi(OR')$_3$, e.g., methylsilyltriethoxide [MeSi(OEt$_3$)], where R and R' are alkyls with 1–5 carbon atoms and may be the same or different.

The support of the catalyst system of the present invention should be an inert solid which is chemically unreactive with any of the components of the conventional Ziegler-Natta catalyst. The support is preferably a magnesium compound. Examples of the magnesium compounds which are to be used to provide a support for the catalyst component are magnesium halides, dialkoxymagnesiums, alkoxymagnesium halides and carboxylates of magnesium. The preferred magnesium compound is a magnesium chloride (MgCl$_2$).

Optionally, the Ziegler-Natta catalyst may be pre-polymerized. Generally, a prepolymerization process is effected by contacting a small amount of monomer with the catalyst after the catalyst has been contacted with the co-catalyst. A pre-polymerization process is described in U.S. Pat. Nos. 5,106,804; 5,153,158; and 5,594,071, hereby incorporated by reference.

The catalyst may be used in any known process for the homopolymerization or copolymerization of any type of α-olefins. For example, the present catalyst may be useful for catalyzing ethylene, propylene, butylene, pentene, hexene, 4-methylpentene and other α-alkenes having at least 2 carbon atoms, and also for mixtures thereof. Preferably, the catalysts of the present invention are utilized for the polymerization of ethylene to produce polyethylene.

The activity of the catalyst of the present invention at least partially depend upon the polymerization process and conditions. Generally, the catalyst has an activity of at least 6,000 gPE/g catalyst, but the activity may also be greater than 100,000 gPE/g catalyst.

Additionally, the resulting catalyst of the present invention provides a polymer with excellent fluff morphology. Thus, the catalyst of the present invention provides for large polymer particles with a uniform distribution of sizes, wherein small, extremely fine particles (less than about 125 microns) are only present in low concentrations. The catalysts of the present invention, which include large, readily transferred powders with high powder bulk densities, are amenable to polymerization production processes.

The polymerization process may be bulk, slurry or gas phase. It is preferred to use a catalyst synthesized above in a slurry phase polymerization. The polymerization conditions (e.g., temperature and pressure) are dependent upon the type of equipment utilized, as well as the type of polymerization process performed, and are known in the art. Generally the temperature may be in a range of about 50–200° C. and the pressure in a range of about 10–800 psi.

The olefin monomer may be introduced into the polymerization reaction zone in a diluent which is a nonreactive heat transfer agent which is liquid at the reaction conditions. Examples of such a diluent are hexane and isobutane. For the copolymerization of ethylene with another alpha-olefin, such as, for example, butene or hexene, the second alpha-olefin may be present at 0.01–20 mole percent, preferably 0.02–10 mole percent.

For the polymerization process, it may be preferred to include an internal electron donor in the synthesis of the catalyst and an external electron donor or stereoselectivity control agent (SCA) to activate the catalyst at polymerization. An internal electron donor may be used in the formation reaction of the catalyst during the chlorination or chlorination/titanation steps. Compounds suitable as internal electron-donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate.

External donors which may be utilized in the preparation of a catalyst according to the present invention include organosilane compounds such as alkoxysilanes of general formula $SiR_m(OR')_{4-m}$ where R is selected from the group consisting of an alkyl group, a cycloalkyl group, an aryl group and a vinyl group; R' is an alkyl group; and m is 0–3, wherein R may be identical with R'; when m is 0, 1 or 2, the R' groups may be identical or different; and when m is 2 or 3, the R groups may be identical or different.

Preferably, the external donor of the present invention is selected from a silane compound of the following formula:

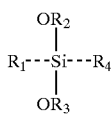

wherein R1 and R4 are both an alkyl or cycloalkyl group containing a primary, secondary or tertiary carbon atom attached to the silicon, R1 and R4 being the same or different; R2 and R3 are alkyl or aryl groups. R1 may be methyl, isopropyl, cyclopentyl, cyclohexyl or t-butyl; R2 and R3 may be methyl, ethyl, propyl, or butyl groups and not necessarily the same; and R4 may also methyl, isopropyl, cyclopentyl, cyclohexyl or t-butyl. Specific external donors are cyclohexylmethydimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

Polyethylene produced using the above described catalyst will have an MWD less than about 7.0, preferably less than about 6.0, more preferably less than about 5.5, and even more preferably less than about 5.0.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLES

The following examples are provided merely to illustrate certain embodiments of the invention, and are not meant to limit the scope of the claims.

Catalyst Preparation

This example provides an illustration of a controlled-morphology polyethylene catalyst that allows for production of a more narrow molecular weight distribution (MWD) polymer. The narrow intrinsic MWD of the catalyst can be exploited to afford resins which are suitable for injection molding applications.

Below is the synthetic strategy for the controlled-morphology catalyst. Salient data concerning the polymer MWD given by this catalyst under standard bench reactor conditions are given in Table 1. As can be seen from this data, the MWD of the polymer is fairly narrow as gauged by shear response (SR5) and polydispersity ($M_w/M_n$) values.

The catalyst was made as follows:

Step 1

BuEtMg/DIAE/TEAl (1:0.6:0.03)+2-Ethylhexanol (2.09) to provide soluble intermediate A.

Step 2

Intermediate+1.0 ClTi(OPr)$_3$ to provide soluble intermediate B.

Step 3

Intermediate B+Ti(OPr)$_4$/TiCl$_4$ (2.0:1.0) to provide solid precatalyst.

Step 4

Precatalyst+TiCl$_4$ (0.25)+TEAl provide the final catalyst.

Polymerization

The reactor (Autoclave Engineer) used for the polymerization of ethylene has a four liter capacity and is fitted with four mixing baffles with two opposed pitch mixing propellers. Ethylene and hydrogen are introduced to the reactor vessel via Teledyne-Hastings Raydist mass flow controllers while a dome loaded back-pressure regulator keeps the internal reaction pressure constant. The reaction temperature is maintained (in the reactor jacket) by steam and cold water using a Kammer Valve linked to a Barber-Coleman Controller. Hexane was used as diluent.

Experimental Variables

| | |
|---|---|
| Temperature | 80° C. |
| Reaction time | 60 min |
| Pressure | 125 psi |
| Catalyst | 0.2 cc slurry (ca. 10 mg catalyst) |
| Cocatalyst | TEAL @ 0.25 mmole/L |
| Flow rates | H$_2$/C$_2$ @ 0.25 |

TABLE 1

MWD Data for Controlled Morphology Catalysts

| Catalyst | ppt. Reagent | M15 (dg/min) | HLMI (dg/min) | SR5 | $M_w/M_n$ |
|---|---|---|---|---|---|
| Standard | TiCl$_4$ (OBu)$_4$ | 1.86 | 19.5 | 10.4 | 5.4 |
| Modified | TiCl$_4$ (OPr)$_4$ | 9.07 | 85.2 | 9.4 | 4.9 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A catalyst component produced by a process comprising:
   a) contacting a soluble magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms;
   b) contacting reaction product A with a first halogenating/titanating agent to form reaction product B; and
   c) contacting reaction product B with a second halogenating/titanating agent to form a catalyst component,
   wherein the first halogenating/titanating agent is a blend of Ti(OPr)$_4$/TiCl$_4$.

2. The catalyst component of claim 1 wherein the soluble magnesium dialkoxide compound is a reaction product of a reaction comprising an alkyl magnesium compound of the general formula MgRR', wherein R and R' are alkyl groups of 1–10 carbon atoms and may be the same or different, and an alcohol of the general formula R"OH wherein the alcohol is linear or branched and wherein R" is an alkyl group of 2–20 carbon atoms.

3. The catalyst component of claim 2 wherein the soluble magnesium compound is a magnesium di(2-ethylhexoxide).

4. The catalyst component of claim 2 wherein the alkyl magnesium compound is diethyl magnesium, dipropyl magnesium, dibutyl magnesium or butylethylmagnesium.

5. The catalyst component of claim 2 wherein the alcohol is ethanol, propanol, isopropanol, butanol, isobutanol or 2-ethylhexanol.

6. The catalyst component of claim 2 wherein the reaction further comprises an aluminum alkyl.

7. The catalyst component of claim 6 wherein the aluminum alkyl is triethylaluminum.

8. The catalyst component of claim 1 wherein the first halogenating/titanating agent is a blend of Ti(OPr)$_4$/TiCl$_4$ in a ratio of TiCl$_4$ to Ti(OPr)$_4$ in the range of about 0.5:1 to about 6:1.

9. The catalyst component of claim 1 wherein the reaction further comprises an electron donor.

10. The catalyst component of claim 9 wherein the ratio of electron donor to magnesium is in the range of about 0:1 to about 10:1.

11. The catalyst component of claim 10 wherein the electron donor is an ether.

12. The catalyst component of claim 1 wherein the halogenating agent is of the general formula ClAR'"$_x$, wherein A is a nonreducing oxyphilic compound, R'"$_x$ is a hydrocarbyl moiety having from about 2 to 6 carbon atoms, and x is the valence of A minus 1.

13. A catalyst produced by a process comprising:
   a) contacting a catalyst component with an organoaluminum preactivating agent, wherein the catalyst component is produced by a process comprising,
      i) contacting a soluble magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms;
      ii) contacting reaction product A with a first halogenating/titanating agent to form reaction product B; and
      iii) contacting reaction product B with a second halogenating/titanating agent to form a catalyst component;
   wherein the first halogenating/titanating agent is a blend of Ti(OPr)$_4$/TiCl$_4$.

14. The catalyst of claim 13 wherein the soluble magnesium dialkoxide compound is a reaction product of a reaction comprising an alkyl magnesium compound of the general formula MgRR', wherein R and R' are alkyl groups of 1–10 carbon atoms and may be the same or different, and an alcohol of the general formula R"OH wherein the alcohol is linear or branched and wherein R" is an alkyl group of 2–20 carbon atoms.

15. The catalyst of claim 14 wherein the soluble magnesium compound is a magnesium di(2-ethylhexoxide).

16. The catalyst of claim 14 wherein the alkyl magnesium compound is diethyl magnesium, dipropyl magnesium, dibutyl magnesium or butylethylmagnesium.

17. The catalyst of claim 14 wherein the alcohol is ethanol, propanol, isopropanol, butanol, isobutanol or 2-ethylhexanol.

18. The catalyst of claim 14 wherein the soluble magnesium dialkoxide compound is a reaction product of a reaction further comprising an aluminum alkyl.

19. The catalyst of claim 18 wherein the aluminum alkyl is triethylaluminum.

20. The catalyst of claim 13 wherein the first halogenating/titanating agent is a blend of Ti(OPr)$_4$/TiCl$_4$ in a ratio of TiCl$_4$ to Ti(OPr)$_4$ in the range of about 0.5:1 to about 6:1.

21. The catalyst of claim 14 wherein the reaction further comprises an electron donor.

22. The catalyst of claim 21 wherein the ratio of electron donor to magnesium is in the range of about 0.1:1 to about 10:1.

23. The catalyst of claim 22 wherein the electron donor is an ether.

24. The catalyst of claim 13 wherein the halogenating agent is of the general formula ClAR'"$_x$, wherein A is a nonreducing oxyphilic compound, R'"$_x$ is a hydrocarbyl moiety having from about 2 to 6 carbon atoms, and x is the valence of A minus 1.

25. The catalyst of claim 13 wherein the second chlorinating/titanating agent is a titanium halide.

26. The catalyst of claim 25 wherein the second chlorinating/titanating agent is titanium tetrachloride, and wherein ratio of titanium to magnesium is in the range of from about 0.5 to about 5.

27. The catalyst of claim 13 wherein the organoaluminum preactivating agent is an aluminum alkyl of the formula AlR^$_3$ where R^ is an alkyl having 1–8 carbon atoms or a halide, R^ being the same or different and at least one R^ is an alkyl.

28. The catalyst of claim 25 wherein the organoaluminum preactivating agent is a trialkyl aluminum.

29. The catalyst of claim 13 wherein the ratio of aluminum to titanium is in the range from 0.1:1 to 2:1.

30. The catalyst of claim 13 wherein the catalyst has a fluff morphology amenable to polymerization production processes, will provide a polyethylene having a molecular weight distribution less than about 7.0 will have an activity of at least 6,000 gPE/g catalyst, and will provide uniform particle size distributions.

31. A process for forming a catalyst component, the process comprising:
   a) contacting a soluble magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms;
   b) contacting reaction product A with a first halogenating/titanating agent to form reaction product B; and
   c) contacting reaction product B with a second halogenating/titanating agent to form a catalyst component,
   wherein the first halogenating/titanating agent is a blend of Ti(OPr)$_4$/TiCl$_4$.

32. The process of claim 31 wherein the soluble magnesium dialkoxide compound is a reaction product of a reaction comprising an alkyl magnesium compound of the general formula MgRR', wherein R and R' are alkyl groups of 1–10 carbon atoms and may be the same or different, and alcohol of the general formula R"OH wherein the alcohol is linear or branched and wherein R" is an alkyl group of 2–20 carbon atoms.

33. The process of claim 32 wherein the soluble magnesium compound is a magnesium di(2-ethylhexoxide).

34. The process of claim 32 wherein the alkyl magnesium compound is diethyl magnesium, dipropyl magnesium, dibutyl magnesium or butylethylmagnesium.

35. The process of claim 32 wherein the alcohol is ethanol, propanol, isopropanol, butanol, isobutanol or 2-ethylhexanol.

36. The process of claim 32 wherein the reaction further comprises an aluminum alkyl.

37. The process of claim 36 wherein the aluminum alkyl is triethylaluminum.

38. The process of claim 31 wherein the first halogenating/titanating agent is a blend of Ti(OPr)$_4$/TiCl$_4$ in a ratio of TiCl$_4$ to Ti(OPr)$_4$ in the range of about 0.5:1 to about 6:1.

39. The process of claim 31 wherein the second chlorinating/titanating agent is a titanium halide.

40. The process of claim 39 wherein the second chlorinating/titanating agent is titanium teterachloride, and wherein ratio of titanium to magnesium is in the range of from about 0.5 to about 5.

41. A process for making a catalyst, the process comprising:
   a) contacting a catalyst component with an organoaluminum preactivating agent, wherein the catalyst component is produced by a process comprising
      i) contacting a soluble magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms;
      ii) contacting reaction product A with a first halogenating/titanating agent to form reaction product B; and
      iii) contacting reaction product B with a second halogenating/titanating agent, wherein the first halogenating/titanating agent is a blend of Ti(OPr)$_4$/TiCl$_4$.

42. The process of claim 41 wherein the first halogenating/titanating agent is a blend of Ti(OPr)$_4$/TiCl$_4$ in a ratio of TiCl$_4$ to Ti(OPr)$_4$ in the range of about 0.5:1 to about 6:1.

43. The process of claim 42 wherein the ratio of TiCl$_4$ to Ti(OPr)$_4$ is about 2:1.

44. The process of claim 41 wherein the soluble magnesium dialkoxide compound is a reaction product of a reaction comprising an alkyl magnesium compound of the general formula MgRR', wherein R and R' are alkyl groups of 1–10 carbon atoms and may be the same or different, and and alcohol of the general formula R"OH wherein the alcohol is linear of branched and wherein R" is an alkyl group of 2–20 carbon atoms.

45. The process of claim 41 wherein the soluble magnesium compound is a magnesium di(2-ethylhexoxide).

46. The process of claim 41 wherein the alkyl magnesium compound is diethyl magnesium, dipropyl magnesium, dibutyl magnesium or butylethylmagnesium.

47. The process of claim 44 wherein the alcohol is ethanol, propanol, ispropanol, butanol, isobutanol or 2-ethylhexanol.

48. The process of claim 41 wherein the soluble magnesium dialkoxide compound is a reaction product of a reaction further comprising an aluminum alkyl.

49. The process of claim 48 wherein the aluminum alkyl is triethylaluminum.

50. The process of claim 41 wherein the reaction further comprises an electron donor.

51. The process of claim 50 wherein the ration of electron donor to magnesium is in the range of about 0.1:1 to about 10:1.

52. The process of claim 51 wherein the electron donor is an ether.

53. The process of claim 41 wherein the halogenating agent is of the general formula ClAR"'$_x$, wherein A is a nonreducing oxyphilic compound, and R"'$_x$ is a hydrocarbyl moiety having about 2 to 6 carbon atoms, and x is a valence of A minus 1.

54. The process of claim 41 wherein the second chlorinating/titanating agent is a titanium halide.

55. The process of claim 41 wherein the second chlorinating/titanating agent is titanium tetrachloride, and wherein the ratio of titanium to magnesium is in the range of from about 0.5 to about 5.

56. The process of claim 41 wherein the organoaluminum preactivating agent is an aluminum alkyl.

57. The process of claim 41 wherein the electron donor is present in any one of steps a), i), ii), iii), and wherein the ratio of electron donor to metal is in the range of about 0.1:1 to about 10:1.

58. A process for α-olefin polymerizaton, comprising:
   a) contacting one or more α-olefin monomers together in the presence of a catalyst under polymerization conditions, wherein the catalyst was produced by a process comprising:
      i) contacting a soluble magnesium dialkoxide compound of the general formula Mg(OR")$_2$ with a halogenating agent capable of exchanging one halogen for one alkoxide to form a reaction product A, where R" is a hydrocarbyl of substituted hydrocarbyl having from 1 to 20 carbon atoms;
      ii) contacting reaction product A with a first halogenating/titanating agent to form reaction product B; and
      iii) contacting reaction product B with a second halogenating/titanating agent to form reaction product C, wherein the first halogenating/titanating agent is a blend of Ti(OPr)$_4$/TiCl$_4$.

59. The process of claim 58 further comprising:

b) extracting a polyolefin polymer.

60. The process of claim 59 wherein the polymer has a molecular weight distribution of less than about 7.0.

61. The process of claim 59 wherein the polymer is a polyethylene.

62. The process of claim 58 wherein the catalyst is produced by a process further comprising:

iv) contacting reaction product C with an organoaluminum agent.

63. The process of claim 58 wherein the first halogenating/titanating agent is a blend of Ti(OPr)$_4$/TiCl$_4$ in a ratio of TiCl$_4$ to Ti(OPr)$_4$ in the range of about 0.5:1 to about 6:1.

64. The process of claim 63 wherein the ratio of TiCl$_4$ to Ti(OPr)$_4$ is about 2:1.

65. The process of claim 58 wherein the halogenating agent of step i) is of the general formula ClAR'''$_x$, wherein A is a nonreducing oxyphilic compound, and R'''$_x$ is a hydrocarbyl moiety having from about 2 to 6 carbon atoms, and x is the valence of A minus 1.

66. The process of claim 65 wherein the halogenating agent is ClTi(O$^i$Pr)$_3$.

67. The process of claim 65 wherein the second chlorinating/titanating agent is a titanium halide.

68. The process of claim 67 wherein the second chlorinating/titanating agent is titanium tetrachloride, and wherein ratio of titanium to magnesium is in the range of from about 0.5 to about 5.

69. The process of claim 62 wherein the organoaluminum agent is triethylaluminum.

70. The process of claim 62 wherein an electron donor is present in any one of steps i)–iv), and wherein the ratio of electron donor to metal is in the range of about 0.1:1 to about 10:1.

* * * * *